Aug. 23, 1927.
E. SCHULTZ
1,639,860
CASTER WHEEL
Filed June 21, 1926
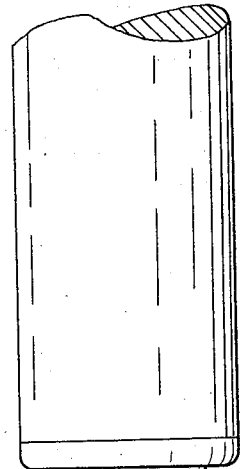
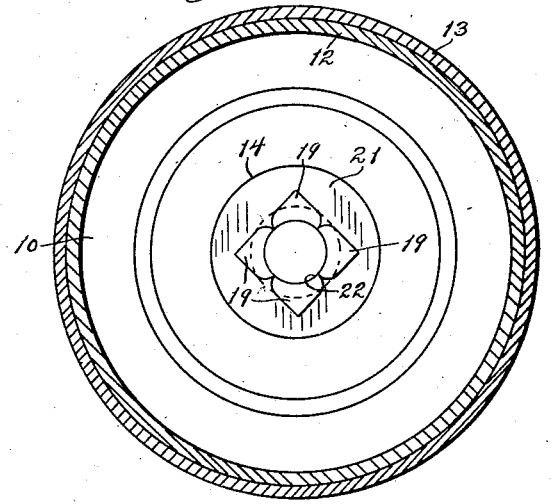
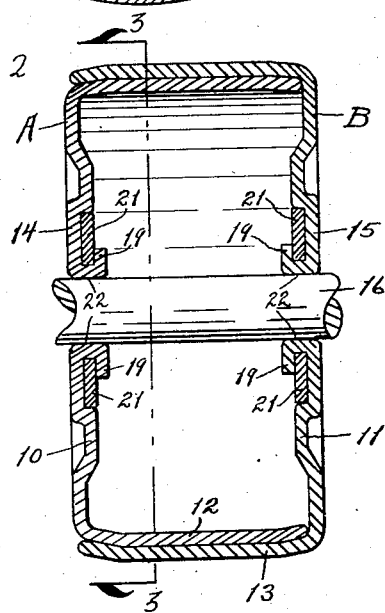
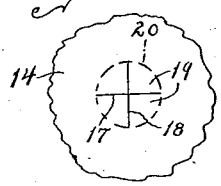
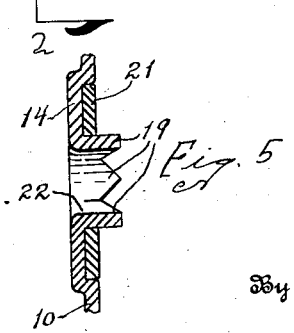
Inventor
EDWARD SCHULTZ
By Earl M. Sinclair
Attorney Patented Aug. 23, 1927.

1,639,860

UNITED STATES PATENT OFFICE.

EDWARD SCHULTZ, OF CHICAGO, ILLINOIS, ASSIGNOR TO JAMES B. LADD, OF DES MOINES, IOWA.

CASTER WHEEL.

Application filed June 21, 1926. Serial No. 117,373.

The object of this invention is to provide an improved construction for a metallic wheel especially designed for use on casters and the like.

More specifically, the object is to provide a simple, efficient and inexpensive means of strengthening and reenforcing the hub of the wheel.

Still a further object is to provide a wheel the shell of which is stamped from metal and formed with a boss concentrically of its axis, together with a washer or annular disk rigidly mounted in said boss to strengthen the shell and to prevent undue wear of the part that is journaled on an axle.

With these and other objects in view, my invention consists in the construction, arrangement and combination of elements hereinafter set forth, pointed out in the claims and illustrated by the accompanying drawing, in which—

Figure 1 is an elevation showing my improved wheel assembled in a caster and in position for practical use.

Figure 2 is a section diametrically of the wheel, on the line 2—2 of Figure 1.

Figure 3 is a section through the wheel, on the line 3—3 of Figure 2.

Figure 4 is a detail view indicating how the shell is cut and bent at the hub.

Figure 5 is a detail section of the hub of a shell member showing how a washer is mounted in the central boss, before the securing lugs are upset.

In the construction of the device as shown the wheel is formed of two shell members A and B in a common manner, each shell member having a side wall 10 or 11 and a peripheral rim 12 or 13, one rim member being forced over and embracing the other to assemble the shell members rigidly together, whereupon the outermost rim member 13 forms the tread of the wheel and is strengthened and supported by the innermost rim member 12. In the formation of the shell members A and B they are pressed inwardly on circular lines concentric with their centers and then embossed outwardly to form central bosses 14 and 15 respectively, the bosses being located within and of smaller diameter than the inwardly pressed portions as clearly shown in Figures 2 and 3. At the centers of the bosses 14 and 15 the shell members are formed with hubs or journals for an axle 16, which may be done as follows: The metal is cut on lines 17 and 18 which intersect at right angles on the center of the shell, as indicated in Figure 4, and the prongs or lugs 19 thus formed are then pressed inwardly of the shell on a circular line 20 which conforms substantially to the diameter of the axle 16. An annular disk or washer 21 is then inserted from the inside of the shell member and located within the boss 14, or 15, said washer conforming in its outside diameter to the inner diameter of the boss and also conforming in its inner diameter to the outer diameter of the hub portion 22 formed by the inwardly projecting lugs 19. The washer 21 may be of different metal than the shells if desired, and different tensile strength. It fits snugly around the hub 22 and within the boss and preferably is of a thickness corresponding to the depth of the boss so that it completely fills the same. The inwardly projecting lugs, now in the position of Figure 5, are then riveted or upset by machinery or in any suitable manner against the inner face of the washer 21 to hold the same securely in place and form a reenforced hub as shown in Figures 2 and 3. After this operation the shell members are assembled together and the axle 16 is put in place in the hubs and it may then be mounted in a caster yoke such as 23 and upset at its ends or otherwise suitably secured.

The bosses 14 and 15 at the centers of the shell members in themselves strengthen said shells against crushing strain under a load; when reenforced by mounting and rigidly securing the washers 21 therein, the reenforcing function is greatly enlarged, and particularly with respect to the hub portions 22 where the greatest wear occurs in use. The insertion of the washers also serves to elongate the journals and give a greater bearing surface on the axle.

It is obvious that other methods may be employed of mounting a disk or washer rigidly in an embossed portion of the shell, and I do not wish to be understood as limiting myself to the precise construction shown, except as defined by the appended claims.

I claim as my invention—

1. A wheel comprising side walls and a tread portion, said side walls being formed with central bosses, lugs struck laterally at the center of each boss to form an axle aperture, a washer mounted in each of said bosses concentrically of said aperture, said lugs being upset against the face of said washer.

2. A wheel comprising side walls and a tread portion, each side wall being formed at its center with an aperture to receive an axle and with prongs at the margin of said aperture, a washer mounted against the face of each side wall concentrically with its aperture, and said prongs being upset against the face of said washer and constituting the sole means to hold it in place.

EDWARD SCHULTZ.